(12) United States Patent
Malina

(10) Patent No.: US 8,554,741 B1
(45) Date of Patent: Oct. 8, 2013

(54) TIMELINE APPLICATION FOR LOG STRUCTURED STORAGE DEVICES

(75) Inventor: James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 253 days.

(21) Appl. No.: 12/816,920

(22) Filed: Jun. 16, 2010

(51) Int. Cl.
*G06F 7/00* (2006.01)
*G06F 17/00* (2006.01)

(52) U.S. Cl.
USPC .......................................... 707/674

(58) Field of Classification Search
None
See application file for complete search history.

(56) References Cited

U.S. PATENT DOCUMENTS

| | | | |
|---|---|---|---|
| 5,367,669 A * | 11/1994 | Holland et al. ............. 714/6.32 |
| 6,345,346 B1 | 2/2002 | Biessener et al. |
| 6,701,456 B1 | 3/2004 | Biessener |
| 7,155,448 B2 | 12/2006 | Winter |
| 7,181,560 B1 | 2/2007 | Grand et al. |
| 7,412,585 B2 | 8/2008 | Uemura |
| 7,447,850 B1 | 11/2008 | Del Rosso et al. |
| 7,509,471 B2 | 3/2009 | Gorobets |
| 7,685,360 B1 | 3/2010 | Brunnett et al. |
| 2002/0169996 A1* | 11/2002 | King et al. ...................... 714/8 |
| 2003/0134648 A1* | 7/2003 | Reed et al. .................... 455/456 |
| 2004/0059869 A1* | 3/2004 | Orsley ........................... 711/114 |
| 2006/0136777 A1 | 6/2006 | Terashita et al. |
| 2007/0101055 A1 | 5/2007 | Thorsen |
| 2008/0028144 A1 | 1/2008 | Sutoh et al. |
| 2008/0059694 A1 | 3/2008 | Lee |
| 2008/0104308 A1 | 5/2008 | Mo et al. |
| 2008/0155680 A1 | 6/2008 | Guyot |
| 2008/0228833 A1* | 9/2008 | Kano ............................. 707/202 |
| 2009/0019218 A1 | 1/2009 | Sinclair et al. |
| 2009/0150599 A1 | 6/2009 | Bennett |
| 2009/0193193 A1* | 7/2009 | Kern ............................. 711/128 |
| 2010/0017359 A1 | 1/2010 | Kiernan et al. |

OTHER PUBLICATIONS

Harrison, CDIA Training & Test Preparation Guide 2000, Specialized Solutions, p. 52.*

* cited by examiner

*Primary Examiner* — Jason Liao (57) ABSTRACT

A host computer receives log structured data from a data storage device (DSD), wherein the log structured data comprises logical block addresses (LBAs) corresponding to a plurality of write operations performed on the DSD, and the log structured data comprises at least one duplicated instance of an LBA, wherein each instance of the LBA represents a different write operation. Timeline information related to the log structured data is displayed in an accounting window.

40 Claims, 9 Drawing Sheets

| FILE SYSTEM | DATE: 06/12/2010 | | |
|---|---|---|---|
| FILE NAME | NUMBER OF MODIFICATIONS | DATE CREATED | LAST MODIFIED |
| FILE_1 | 12 | 12/23/2008 | 01/17/2010 |
| FILE_2 | 9 | 02/09/2009 | 09/10/2010 |
| FILE_3 | 200 | 05/10/2009 | 06/13/2009 |
| FILE_4 | 25 | 09/25/2009 | 11/02/2010 |
| FILE_5 | 32 | 09/28/2009 | 05/22/2010 |
| FILE_6 | 7 | 10/17/2009 | 03/10/2010 |
| FILE_7 | 124 | 12/09/2009 | 12/28/2010 |
| FILE_N | 6 | 02/21/2010 | 08/15/2010 |

LOG STRUCTURED DATA FILE   FIG. 9B

FIG. 9C

LOG STRUCTURED DATA FILE

| SEQ# | LBA# | PBA# |
|---|---|---|
| N | 105 | 1226 |
| N+M+2 | 105 | 4570 |
| N | 106 | 1227 |
| N+M+2 | 106 | 4571 |
| N | 108 | 1228 |
| N+M+2 | 108 | 4572 |
| ⋮ | ⋮ | ⋮ |
| N+M+1 | 2136 | 4569 |
| ⋮ | ⋮ | ⋮ |

LOG STRUCTURED DATA

| DATE | SEQ# | LBA# | PBA# | TEMP | SHOCK | LOC. | ... |
|---|---|---|---|---|---|---|---|
| 05/01/2010 | N | 105 | 1226 | 32 | 3 | 343/476 | |
| 05/01/2010 | N | 106 | 1227 | 32 | 3 | 343/476 | |
| 05/01/2010 | N | 108 | 1228 | 32 | 3 | 343/476 | |
| ⋮ | ⋮ | ⋮ | ⋮ | ⋮ | ⋮ | ⋮ | |
| 05/10/2010 | N+M+1 | 2136 | 4569 | 40 | 8 | 156/956 | |
| 05/12/2010 | N+M+2 | 105 | 4570 | 45 | 5 | 228/843 | |
| 05/12/2010 | N+M+2 | 106 | 4571 | 45 | 5 | 228/843 | |
| 05/12/2010 | N+M+2 | 108 | 4572 | 45 | 5 | 228/843 | |
| ⋮ | ⋮ | ⋮ | ⋮ | ⋮ | ⋮ | ⋮ | |

FIG. 11A

FILE_X1

| DATE | NUMBER OF LBAs WRITTEN | OVER WRITE | NEW WRITE | TEMP | SHOCK | LOC. |
|---|---|---|---|---|---|---|
| 05/01/2010 | 245 | | X | 32 | 3 | 228/843 |
| 05/01/2010 | 155 | | X | 36 | 2 | 228/843 |
| 05/05/2010 | 5 | X | | 42 | 7 | 228/843 |
| 05/07/2010 | 25 | X | X | 30 | 7 | 228/843 |
| 05/24/2010 | 125 | | X | 33 | 6 | 751/695 |
| 06/14/2010 | 265 | | X | 41 | 5 | 751/695 |
| 10/22/2010 | 65 | X | X | 40 | 1 | 751/695 |
| 10/27/2010 | 6 | X | | 37 | 8 | 751/695 |

TIMELINE APPLICATION FOR LOG STRUCTURED STORAGE DEVICES

BACKGROUND

Data storage devices (DSDs), such as disk drives and solid state drives are employed in numerous applications such as computer systems (e.g., desktops, laptops, portables, servers, etc.) and consumer devices (e.g., music players, cell phones, cameras, etc.). As files are created, modified, and deleted from the DSD, an operating system maintains a file system (e.g., directory information) wherein the file system itself comprises files written on the DSD. Various applications are available to track the history of a DSD so that the file system can be "rolled back" to a particular date. This enables a user to recover from a catastrophic event, such as a file system file or other file being corrupted by a virus, or if a user inadvertently deletes a file, or if a user would like to recover an earlier version of a file.

The currently available timeline applications typically employ a separate "backup" area of a DSD or a second DSD for maintaining a timeline representation of each file. When a user desires to rollback a DSD to a particular date, the timeline application rolls the DSD to the desired date using the backup files. There are several drawbacks of prior art timeline applications that are overcome by the embodiments of the present invention.

DETAILED DESCRIPTION OF EMBODIMENTS OF THE INVENTION

Figure 1A:
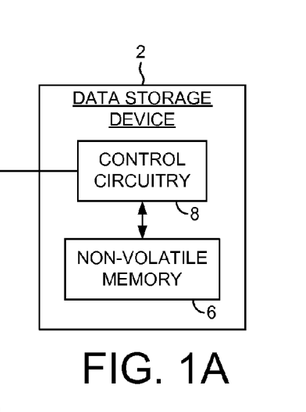
FIG. 1A shows a data storage device (DSD) according to an embodiment of the present invention.
Figure 1B:
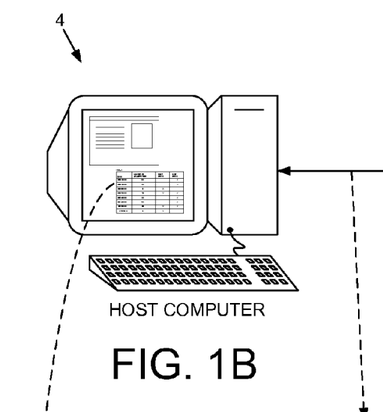
FIG. 1B shows a host computer for executing a timeline application by receiving log structured data from a DSD according to an embodiment of the present invention.

FIG. 1A shows a data storage device (DSD) 2 connected to a host computer 4 (FIG. 1B). The host computer 4 executes code segments of a timeline application in order to receive log structured data (e.g., FIG. 1C) from the DSD 2, wherein the log structured data comprises logical block addresses (LBAs) corresponding to a plurality of write operations performed on the DSD 2, and the log structured data comprises at least one duplicated instance of an LBA, wherein each instance of the LBA represents a different write operation. FIG. 1D shows an accounting window (e.g., displayed in a graphical user interface (GUI)), wherein the accounting window displays timeline information related to the log structured data.

In the embodiment of FIG. 1A, the DSD 2 comprises a non-volatile memory 6 and control circuitry 8 for interfacing with the host computer 4 and the non-volatile memory 6. The DSD 2 may comprise any suitable non-volatile memory, such as a disk, a non-volatile semiconductor memory (e.g., flash), or a combination thereof. In one embodiment, the host computer 4 communicates with the DSD 2 using a conventional protocol, such as a conventional disk drive protocol. In other embodiments, a conventional protocol may be augmented to facilitate various aspects of the present invention as described in greater detail below.

Figure 1C:
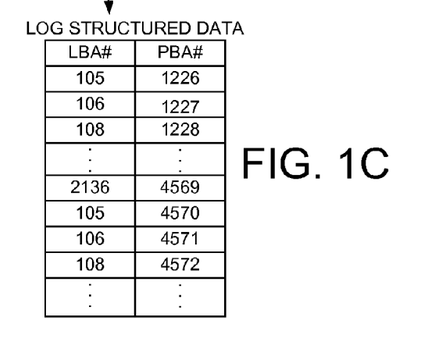
FIG. 1C shows an embodiment of the present invention wherein the log structured data comprises a plurality of entries, and each entry comprises a logical block address (LBA) and corresponding physical block address (PBA).
Figure 1D:
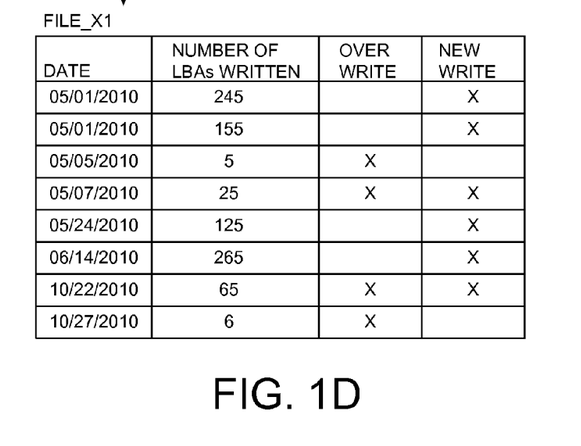
FIG. 1D shows an accounting window according to an embodiment of the present invention showing modifications to a user file over time.

In the embodiment of FIG. 1C, the log structured data comprises a list of entries, wherein each entry identifies an LBA and a corresponding physical block address (PBA) mapped to a memory segment in the non-volatile memory 6 of the DSD 2. The PBA may represent any suitable memory segment, such as a data sector of a track on a disk, or a page (or partial page) of a block in a non-volatile semiconductor memory. The LBA to PBA map facilitates dynamic addressing wherein during overwrite operations the write data is written to new PBAs rather than overwriting existing PBAs as is done with static addressing. In the embodiment illustrated in FIG. 1C, the PBAs are written in ascending order, for example, 0 to M where M represents the highest PBA. FIG. 1C also illustrates a first write operation of LBAs 105, 106, and 108 to PBAs 1226, 1227, and 1228. During a subsequent write operation, the same LBAs are "overwritten" by writing the data to new PBAs 4570, 4571 and 4572. Accordingly, FIG. 1C illustrates multiple instances of the same LBA each corresponding to a different write operation. The log structured data may comprise suitable formats other than that shown in FIG. 1C, such as an embodiment that employs run-length encoding for sequential LBAs and/or PBAs. In addition, the log structured data may comprise different information for identifying each write operation, such as a sequence number that may be used in place of, or in addition to, the PBAs.

The accounting window of FIG. 1D shows an example timeline of write operations for a particular file stored on the DSD 2. In this example, the accounting window displays the date of each write operation on the file, the number of LBAs written, and whether the write operation wrote to new LBAs and/or overwrote existing LBAs of the file. In one embodiment, the log structured data representing the entire life of the DSD 2 is transmitted to the host computer 4 so that the host computer may display a lifetime accounting for every file stored on the DSD 2. In other embodiments, the host computer 2 may request the log structured data from the DSD 2 for the LBAs representing a particular file. In one embodiment, the date of each write operation may be included with the log structured data, and in another embodiment, the date of each write operation may be determined by evaluating file system data read from the DSD 2. For example, the host computer may evaluate a timeline of a directory file stored on the DSD 2 in order to extract the modification date for each write operation of the particular user file shown in FIG. 1D. In one embodiment, when an entry is selected from the accounting window, the version of the file is read from the DSD 2 corresponding to the date of the entry. As described in greater detail below, there are a number of different embodiments for reading a selected version of a file from the DSD 2.

Figure 2A:
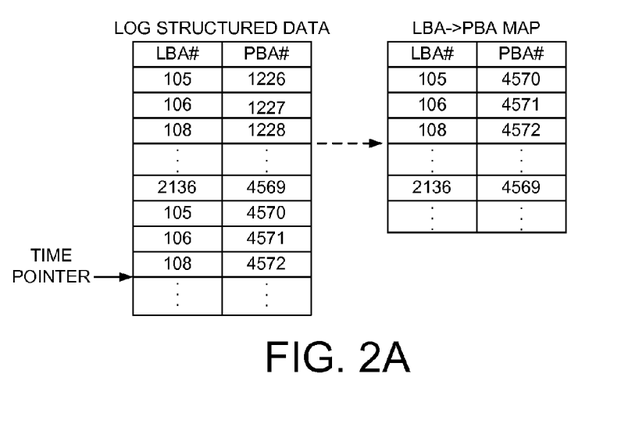
FIG. 2A shows an embodiment of the present invention wherein an LBA map stores a current LBA to PBA mapping.
Figure 2B:
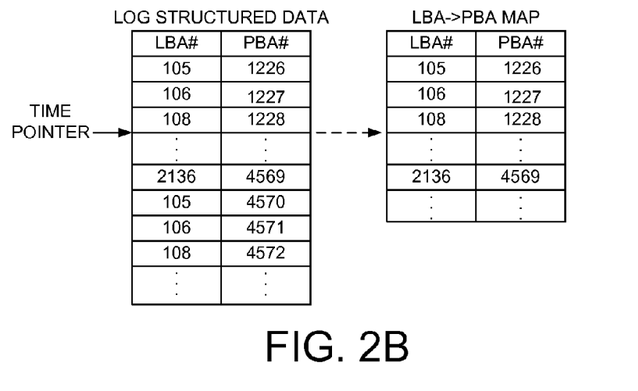
FIG. 2B shows an embodiment of the present invention wherein the LBA map is rolled to a target date (or sequence number) using the log structured data.
Figure 2C:
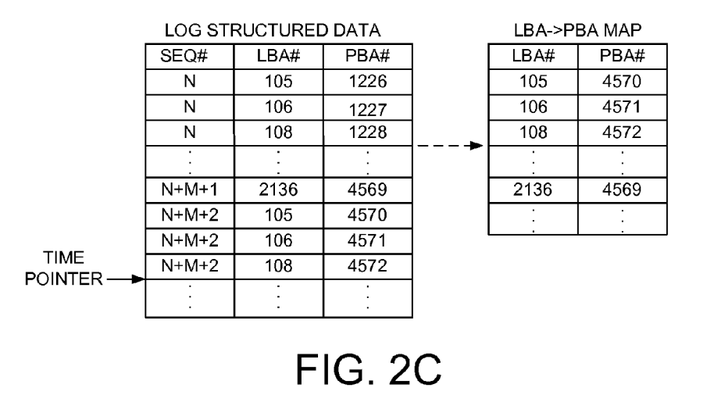
FIG. 2C shows an embodiment of the present invention wherein the log structured data comprises a sequence number for each write operation which represents the date of the write operation.

FIG. 2A shows an embodiment of the present invention wherein the log structured data is used to build an LBA to PBA map for any given date (or sequence number) for the DSD 2. In one embodiment, during normal operation the DSD 2 maintains an LBA to PBA map for the current date of the DSD 2. The DSD 2 may then roll to a previous date by rolling the LBA to PBA map using the log structured data. This embodiment is illustrated in FIG. 2B wherein the LBA to PBA map has been rolled back to a point where LBA 108 was written to PBA 1228. The LBA to PBA map may be "rolled" using any suitable technique, wherein in one embodiment the LBA to PBA map is rolled starting from its current date (e.g., rolled backward or forward using the log structured data). In an alternative embodiment, the LBA to PBA map may be reset to the beginning and then rolled forward to a target date using the log structured data. The target date may be identified using any suitable technique, such as by specifying a particular PBA. In the example of FIG. 2B, the LBA to PBA map is rolled to a date corresponding to when PBA 1228 was written. In an alternative embodiment shown in FIG. 2C, the log structured data may comprise a sequence number corresponding to the sequence of write operations executed on the DSD 2. The target date may be identified by specifying a target sequence number. In another embodiment, the log structured data may comprise a date field for each entry, and the target date may be identified literally by specifying a target date in the log structured data. In one embodiment, the log structured data transmitted to the host computer may comprise the LBA and date (or sequence number) corresponding to when the LBA was written (i.e., it may not be necessary to transmit the PBA to the host computer).

In one embodiment, all of the log structured data for the DSD 2 is transmitted to the host computer 4 and the host computer 4 builds and rolls the LBA to PBA map according to a target date. In this embodiment, the host may access the DSD 2 by generating read commands with PBAs rather than LBAs which may require a corresponding modification to a conventional protocol used to communicate with the DSD 2. In other embodiments of the present invention, the DSD 2 performs all LBA to PBA mapping in order to maintain control over the format of the non-volatile memory 2 and enable certain features transparent to the host, such as storing a redundant copy of data in a "backup" PBA. In this embodiment, if a primary PBA mapped to a given LBA (for a given date) is unrecoverable, the DSD 2 may recover the data from a backup PBA (e.g., stored in the same or different medium) in an operation that is transparent to the host computer 4.

In one embodiment, rather than roll the LBA to PBA map according to a target date, the DSD 2 or the host computer 4 may extract a PBA for a given LBA (and date) directly from the log structured data. For example, for a given LBA and a given date, the DSD 2 or the host computer 4 may search through the log structured data in order to recover the corresponding PBA rather than roll the LBA to PBA map and then recover the corresponding PBA. In an embodiment described in greater detail below, the log structured data may be re-arranged (by the DSD 2 or the host computer 4) so that the LBA entries are grouped together and stored sequentially which helps speed up searching for an LBA according to a particular date (or sequence number).

Figure 3:
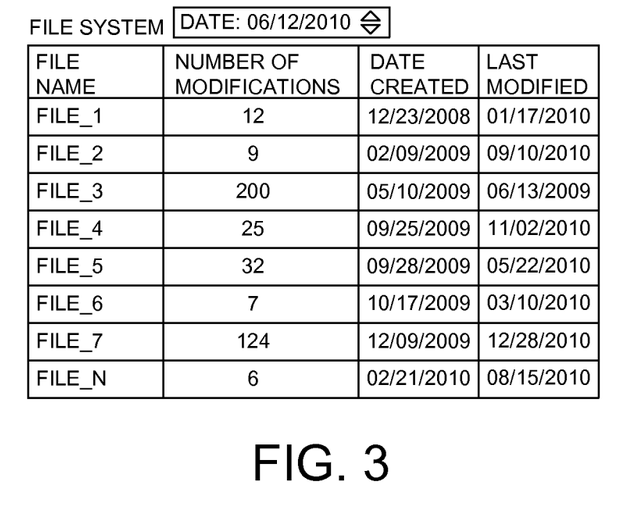
FIG. 3 shows an embodiment of the present invention wherein a file directory is displayed in the accounting window.

In one embodiment, the timeline application running on the host computer 4 constructs a timeline representing the file system data stored on the DSD 2. That is, a DSD 2 typically stores file system data (e.g., a file allocation table) in file system files that is used by the operating system of the host 4 to identify and access the other files (e.g., user files) stored on the DSD 2. By building a timeline of the file system data, the timeline application can display the file system directory for any given date. An example of this embodiment is illustrated in FIG. 3 wherein the accounting window displays a list of the files stored on the DSD 2 for a target date. Also in this embodiment the accounting window displays the number of modifications to each file (up to the target date), the date each file was created, and the last modification date for each file (up to the target date). In one embodiment, the user may enter or scroll the target date, and as the target date changes, the accounting window automatically updates the file names and attendant file information. For example, as a user scrolls the target date forward the corresponding files that are created are shown in the list, and as the user scrolls the target date backward, the corresponding files are removed from the list. The directory of files may be displayed in any suitable format, such as a single list as shown in FIG. 3, or in a conventional directory tree format wherein each node of the tree represents a file system folder.

Figure 4:
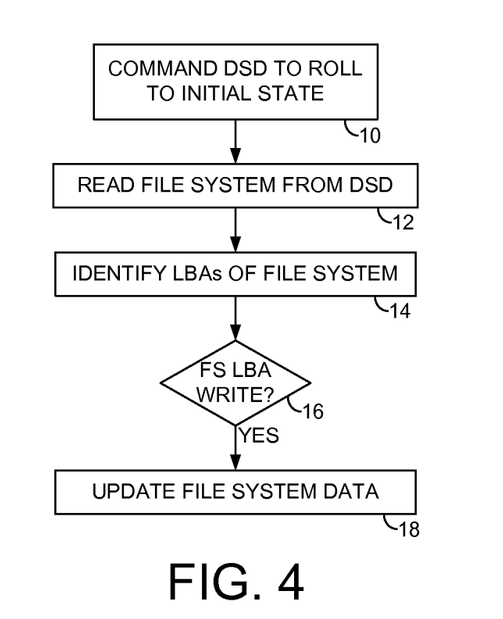
FIG. 4 is a flow diagram according to an embodiment of the present invention wherein the DSD is commanded to roll to an initial state so that the initial file system files can be read in order to generate a timeline of the file system files.

The timeline application may build a timeline of the file system data for the DSD using any suitable technique. FIG. 4 is a flow diagram according to an embodiment of the present invention wherein the timeline application commands the DSD to roll to an initial state (step 10), such as to a state when the file system data was initially stored on the DSD. The timeline application then reads the file system data from the DSD (step 12), and identifies the LBAs of the file system files (step 14). The timeline application then evaluates the log structured data sequentially (from the beginning) to determine when an LBA of a file system file was written (step 16). The file system data maintained by the timeline application is then updated using any suitable technique (step 18).

Figure 5A:
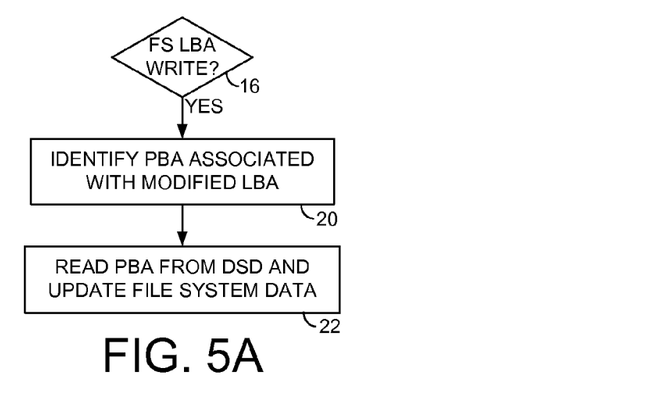
FIG. 5A is a flow diagram according to an embodiment of the present invention wherein when the log structured data indicates an LBA of the file system was modified, the corresponding PBA is read from the DSD.

FIG. 5A is a flow diagram according to an embodiment of the present invention wherein when the timeline application identifies an LBA in the log structured data corresponding to a file system file (step 16), the timeline application identifies the PBA associated with the modified LBA (step 20) and then reads the PBA from the DSD in order to update the timeline information for the file system data (step 22). Accessing the DSD with a read command that specifies a target PBA (rather than a target LBA) may require a modification to a conventional protocol used to communicate with the DSD.

Figure 5B:
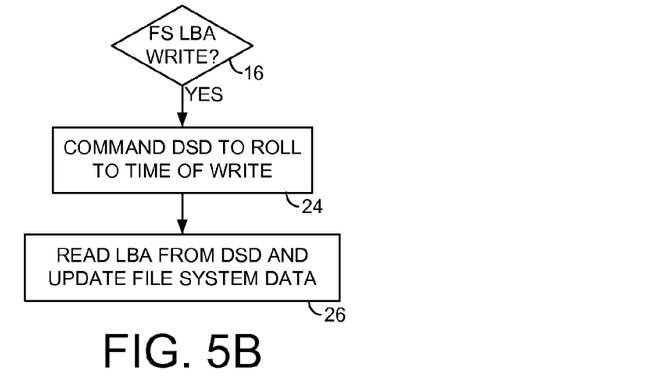
FIG. 5B is a flow diagram according to an embodiment of the present invention wherein when the log structured data indicates an LBA of the file system was modified, the DSD is rolled to the corresponding date and the corresponding LBA read from the DSD.

FIG. 5B is a flow diagram according to an embodiment of the present invention wherein when the timeline application identifies an LBA in the log structured data corresponding to a file system file (step 16), the timeline application commands the DSD to roll to the date corresponding to when the LBA was modified (step 24) and then reads the LBA from the DSD in order to update the timeline information for the file system data (step 26). In this embodiment, other than including a command to roll the DSD, accessing the DSD can be implemented using a conventional protocol for reading data from the DSD since the read commands specify target LBAs.

Figure 5C:
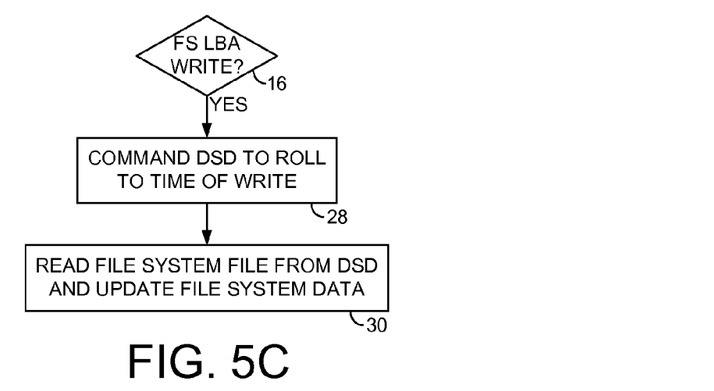
FIG. 5C is a flow diagram according to an embodiment of the present invention wherein when the log structured data indicates an LBA of the file system was modified, the DSD is rolled to the corresponding data and a file system file is read from the DSD.

FIG. 5C is a flow diagram according to an embodiment of the present invention wherein when the timeline application identifies an LBA in the log structured data corresponding to a file system file (step 16), the timeline application commands the DSD to roll to the date corresponding to when the LBA was modified (step 28) and then reads the entire file system file from the DSD in order to update the timeline information for the file system data (step 30). In this embodiment, the timeline application need not understand how each write to a file system LBA will change the corresponding file system file. Instead, the entire file system file is read after each modification similar to how an operating system would read the file system file when initially building a file system directory.

In one embodiment, when building the file system timeline, the LBA to PBA map is initialized to the starting state of the DSD (for example by building the LBA to PBA map from the beginning of time). Then as the timeline application builds the timeline for the file system data, the LBA to PBA map is rolled forward as the log structured data is searched for LBAs corresponding to file system writes. As described above, rolling the LBA to PBA map may be performed by the DSD or by the host computer. In either case, rolling the LBA to PBA map allows any given LBA at any given date (or any given file system file at any given date) to be read quickly.

Figure 6A:
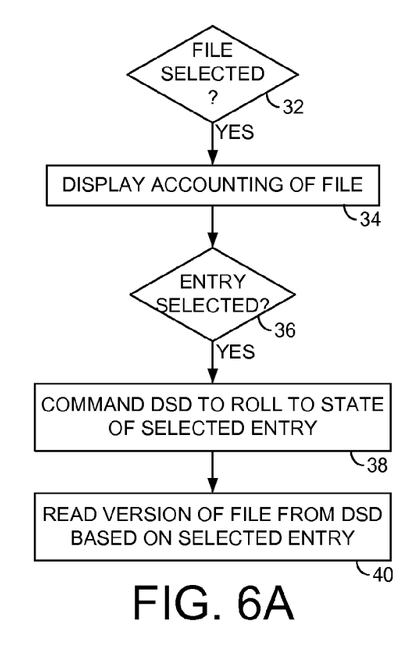
FIG. 6A is a flow diagram according to an embodiment of the present invention wherein when a timeline entry for a file is selected, the DSD is commanded to roll to the corresponding date and the file is read from the DSD.

FIG. 6A is a flow diagram according to an embodiment of the presenting invention wherein when a user selects one of the files from the file directory of FIG. 3 at a target date (step 32), an accounting for the selected file is displayed such as shown in FIG. 1D (step 34). When the user selects an entry from the accounting window for the file (step 36), the timeline application commands the DSD to roll to the corresponding date (step 38) and the corresponding version of the file is read from the DSD using conventional read commands (step 40).

Figure 6B:
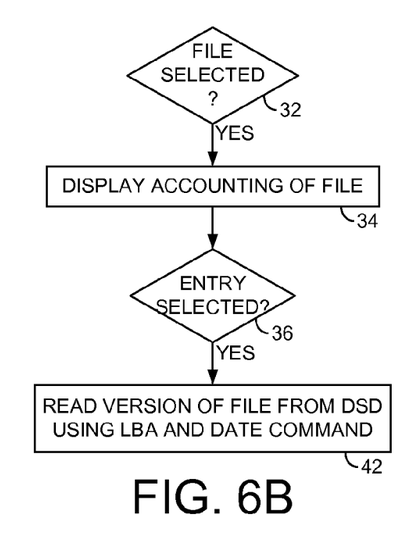
FIG. 6B is a flow diagram according to an embodiment of the present invention wherein when a timeline entry for a file is selected, the file is read from the DSD using read commands each comprising an LBA and write operation identifier such as a target date.

FIG. 6B is a flow diagram according to an embodiment of the presenting invention wherein when the user selects an entry from the accounting window for the file (step 36), the timeline application reads the corresponding version of the file from the DSD using read commands that specify an LBA and a corresponding write operation identifier such as a date or sequence number (step 42). The read commands are then processed (by the DSD or the host computer) by searching the log structured data to find the corresponding PBA for the LBA at the date specified (rather than roll the LBA to PBA map and then lookup the PBA from the LBA to PBA map).

Figure 7A:
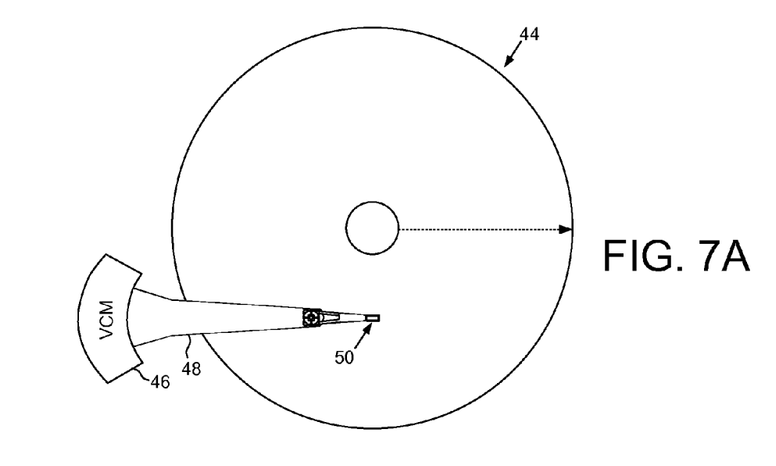
FIG. 7A shows an embodiment of the present invention wherein the DSD comprises a disk drive.

FIG. 7A shows an embodiment of the present invention wherein the DSD 2 of FIG. 1A comprises a disk drive and the non-volatile memory 6 comprises a disk 44. A voice coil motor (VCM) 46 rotates an actuator arm 48 about a pivot in order to actuate a head 50 over the disk 44. The disk 44 comprises a plurality of concentric data tracks, wherein each data track comprises a plurality of data sectors. A PBA is assigned to each data sector and accessed indirectly through an LBA. In the example shown in FIG. 7A, data is written from an inner diameter (ID) of the disk toward an outer diameter (OD) of the disk. That is, the LBAs are assigned to PBAs of data sectors starting at the ID and extending toward the OD, wherein when an LBA is overwritten, the new write data is written to the newest PBA toward the OD whereas the old PBA remains unchanged. The data may be written in any suitable pattern on the disk, such as from the OD to the ID, and in another embodiment, multiple patterns may be employed, such as by writing from the ID to a middle diameter (MD) and from the OD to the MD.

Figure 7B:
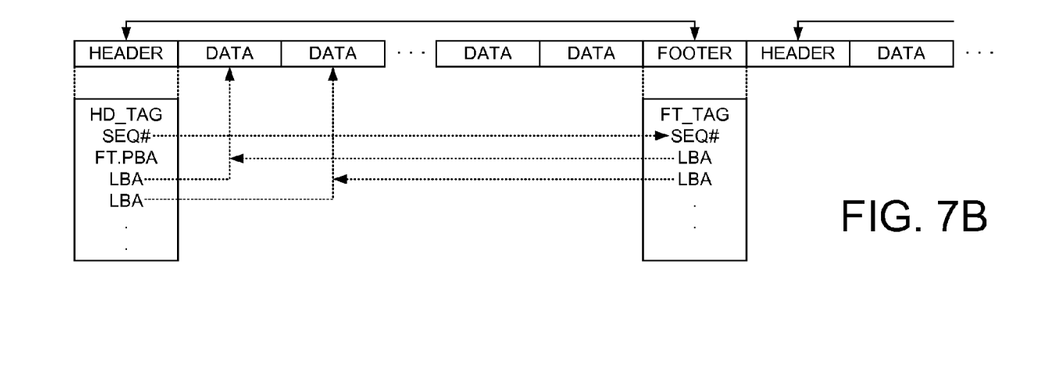
FIG. 7B shows an embodiment of the present invention wherein the log structured data is written in-line in connection with each write operation to the disk.

FIG. 7B shows an embodiment of the present invention wherein log structured data is written in-line with the write data during each write operation to the disk. In the example shown, a header data sector is written comprising a header tag (HD_TAG), a sequence number (SEQ#) of the write operation, a footer PBA (FT.PBA) identifying a footer data sector for the write operation, and at least one LBA written for the write operation. After writing the write data to the data sectors, a footer data sector is written comprising a footer tag (FT_TAG), the sequence number (SEQ#), and the LBAs written. The footer data sector may be used to detect when a write operation was interrupted by a power failure (i.e., a power failure is detected if the footer data sector is missing). The head and footer tags as well as the redundant log structured data helps ensure the footer data sector corresponds to the header data sector. In one embodiment, the log structured data written in-line with each write operation may be used to rebuild and/or to roll an LBA to PBA map as described above.

Figure 8A:
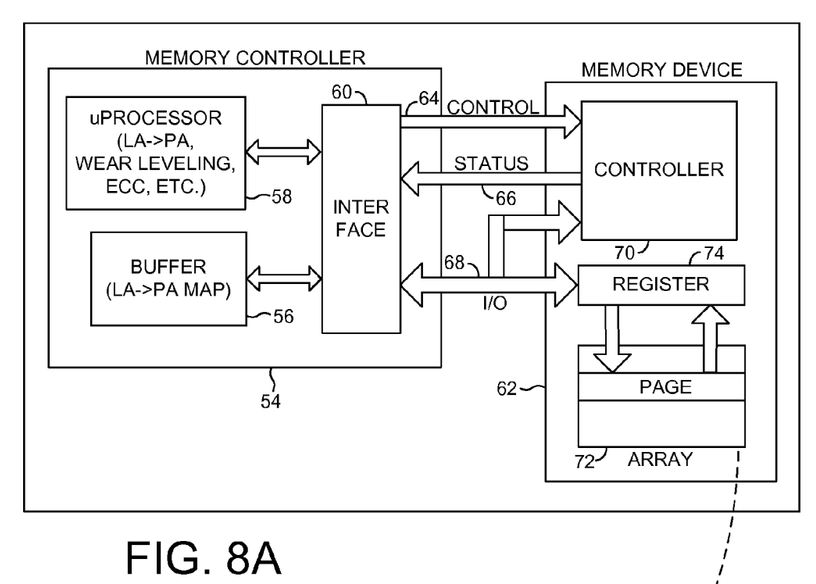
FIG. 8A shows an embodiment of the present invention wherein the DSD comprises a non-volatile semiconductor memory.

FIG. 8A shows an embodiment of the present invention wherein the non-volatile memory 6 in the DSD 2 of FIG. 1A comprises a non-volatile semiconductor memory. Control circuitry 54 comprises a buffer 56 for buffering data for write/read commands, and a microprocessor 58 executing control programs for various algorithms, such as LBA to PBA mapping, wear leveling, error correction code, etc. The control circuitry 54 further comprises interface circuitry 60 for interfacing with one or more memory devices 62, such as a suitable flash memory device. The interface circuitry 60 generates suitable control signals 64 and receives status information 66 from the memory device 62 in connection with executing write/read commands initiated by the microprocessor 58. The interface circuitry 60 also transmits and receives data over an I/O bus 68, including read/write data stored in the buffer 56 or command data generated by the microprocessor 58 and transmitted to a controller 70 integrated with the memory device 62.

The memory device 62 comprises a memory array 72 including a plurality of blocks each comprising a plurality of memory segments referred to as pages. During a write operation, write data received over the I/O bus 68 from the buffer 56 is first stored in a data register 74. The controller 70 then transfers the write data from the data register 74 to a target page in the memory array 72. During a read operation, a page in the memory array 72 is read into the data register 74 and then transferred over the I/O bus 68 where it is stored in the buffer 56.

Figure 8B:
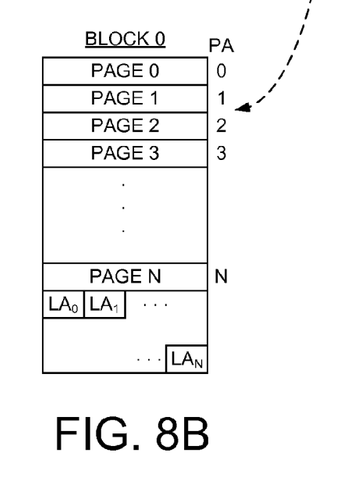
FIG. 8B shows an embodiment of the present invention wherein the log structured data is included with each block written in the non-volatile semiconductor memory.

FIG. 8B shows an embodiment of the present invention wherein each page corresponds to a memory segment addressed by a PBA (and indirectly accessed through an LBA). When a page is written, the log structured data (e.g., LBA) is written in one or more reserved pages at the end of the corresponding block. The example of FIG. 8B shows the first block (BLOCK 0) having pages assigned to the first N PBAs, wherein the corresponding LBAs ($LA_0$-$LA_N$) are stored in the reserved pages at the end of the block. When an LBA is overwritten, the write data is stored in a new page (of the same or different block) and the old page (old PBA) remains unchanged. The log structured data stored at the end of each block may then be used to rebuild or roll the LBA to PBA map as described above.

Figure 9A:
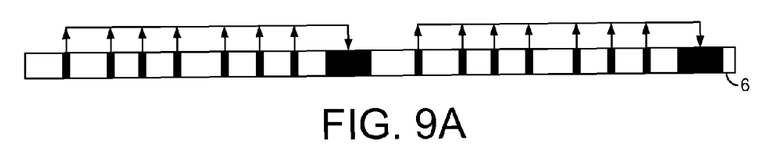
FIG. 9A shows an embodiment of the present invention wherein the in-line log structured data is periodically consolidated.

FIG. 9A shows an embodiment of the present invention wherein during an idle mode of the DSD the in-line log structured data is periodically consolidated. In the example of FIG. 9A, the log structured data for a number of write operations (e.g., seven) are read from the non-volatile memory (e.g., disk or flash) and the consolidated log structured data is re-written to the non-volatile memory. Consolidating the log structured data may improve performance when evaluating the log structured data in order to roll the LBA to PBA map, or when searching for a PBA for a given LBA (without rolling the LBA to PBA map). Consolidating the log structured data also provides redundancy in the event that either copy becomes unrecoverable. The log structured data for any suitable number of write operations may be consolidated, such as tens, hundreds, or even thousands of write operations.

Figure 9B:
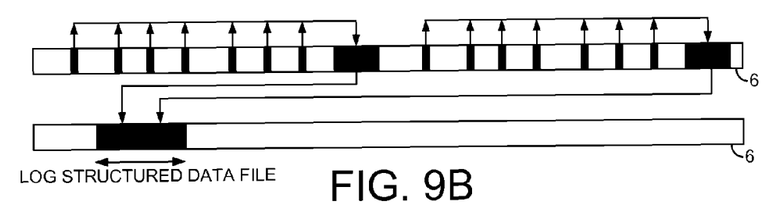
FIG. 9B shows an embodiment of the present invention wherein the DSD builds a log structured data file comprising all of the in-line log structured data for the DSD.

FIG. 9B shows an embodiment of the present invention wherein the consolidated log structured data is further consolidated into a log structured data file. For example, the DSD may be commanded by the host to generate the log structured data file, or the DSD may automatically generate the log structured data file when the non-volatile memory is full (or near full). In one embodiment, when the timeline application is executed, it initially commands the DSD to generate the log structured data file before attempting to evaluate the DSD. Once the log structured data file is generated, the DSD may transmit the file to the timeline application to enable the timeline application to construct the timeline of the file system as described above.

Figure 9C:
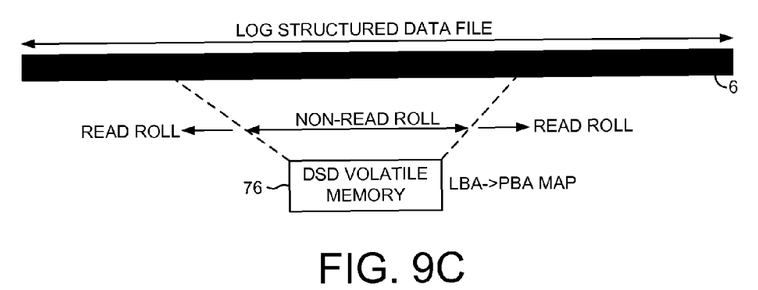
FIG. 9C shows an embodiment of the present invention wherein a portion of the log structured data file is stored in a volatile memory of the DSD to facilitate rolling the LBA map.

FIG. 9C shows an example of how the log structured data file may be employed by the DSD in order to roll the LBA to PBA map (or search for a particular PBA without rolling the LBA to PBA map). In this embodiment, the DSD comprises a volatile memory 76 for buffering part of the log structured data file. The DSD may roll the LBA to PBA map quickly within this timeline without having to perform a read from the non-volatile memory. If the DSD needs to roll the LBA to PBA map outside the buffered range, the control circuitry can quickly read the adjacent log structured data from the file without having to read the in-line log structured data distributed around the non-volatile memory.

Figure 9D:
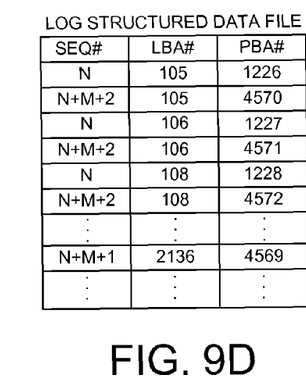
FIG. 9D shows an embodiment of the present invention wherein the entries of the log structured data are arranged by LBA and their sequence of write operations to expedite searching for a PBA mapped to the LBA at a particular date (or sequence number).

FIG. 9D shows an embodiment of the present invention which may expedite the process of searching for a PBA corresponding to an LBA at a given date (or sequence number) instead of rolling the LBA to PBA map. In this embodiment, when the log structured data is consolidated (as in FIG. 9A or 9B), the LBAs are ordered sequentially, and the write operations for each LBA are ordered according to time (or sequence). In this manner, the sequential ordering of the LBAs facilitates any suitable search algorithm (such as a binary search algorithm) so that a PBA can be located quickly rather than evaluate every entry of the log structured data. In one embodiment, the log structured data file described above with reference to FIG. 9B may comprise a number of segments that are sorted according to LBA since it may not be possible to read all of the log structured data into the volatile memory when consolidating the log structured data.

Figure 10:
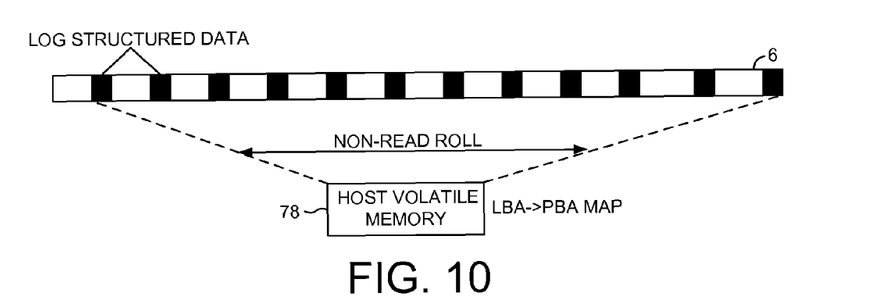
FIG. 10 shows an embodiment of the present invention wherein the entire log structured data file is stored in a volatile memory of the host computer according to an embodiment of the present invention.

FIG. 10 shows an embodiment of the present invention wherein the timeline application reads all of the log structured data from the DSD which is stored in a volatile memory 78 of the host computer. Also in this embodiment, the host computer generates and rolls an LBA to PBA map (or implements a search algorithm as described above) and issues access commands to the DSD using PBAs rather than LBAs. As illustrated in FIG. 10, the host computer may quickly roll the LBA to PBA map (or perform a search for a PBA) without needing to issue reads to the DSD since all of the log structured data is buffered in the host computer. In one embodiment, the DSD may read the log structured data distributed around the non-volatile memory 6, or the DSD may consolidate the log structured data into a file as described above and return the contents of the file to the host.

Figure 11A:
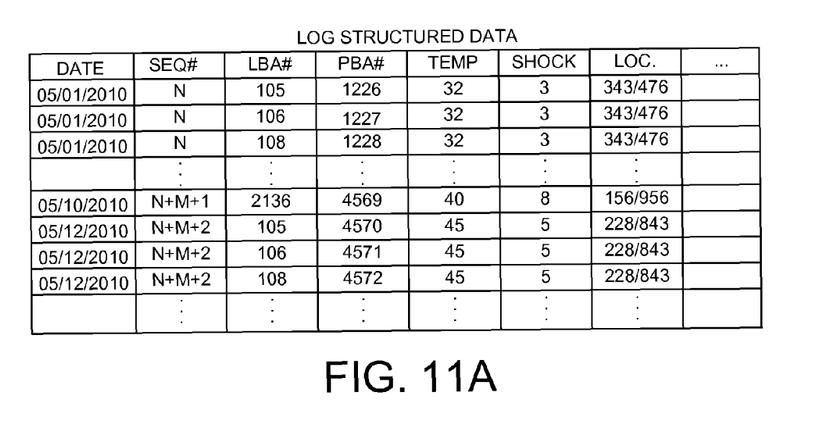
FIG. 11A shows an embodiment of the present invention wherein the log structured data comprises environmental conditions (e.g., temperature, shock), and location information for each write operation.
Figure 11B:
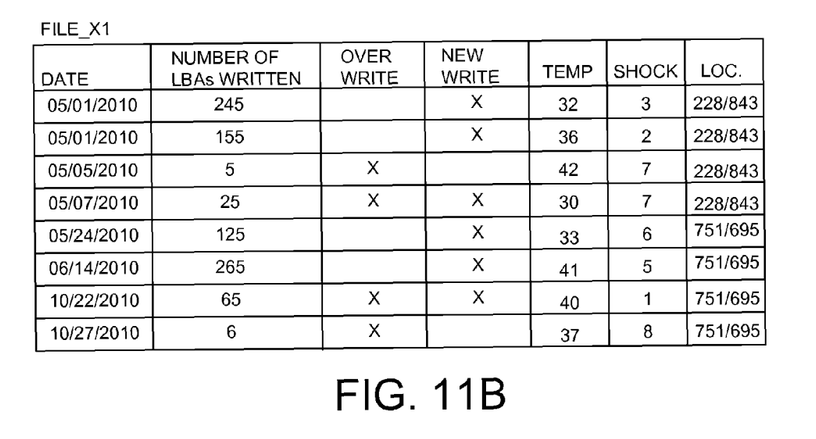
FIG. 11B shows an embodiment of the present invention wherein the accounting window displays the environmental conditions and location information in each timeline entry.

The log structured data may comprise any suitable data associated with each write operation, and in one embodiment, comprises the date as well as environmental and/or location data at the time of each write operation. This embodiment is understood with reference to FIG. 11A which shows an embodiment where the log structured data includes the date, environmental data (e.g., temperature, shock level, altitude, humidity, etc.) and location information (e.g., global position system (GPS) data or longitude/latitude data). FIG. 11A shows an embodiment of the present invention wherein the accounting window of the timeline application may display the additional log structured data for each write operation, and in one embodiment, the timeline application may enable the user to construct filters in order to display only the accounting information that matches the filter criteria. For example, a user may construct a filter to display the accounting data only for a specified date range, or for a specific location, or range of an environmental condition, etc.

In one embodiment, the DSD never overwrites an old PBA such that a timeline for the entire DSD may always be generated. When the DSD is full of data (all or substantially all of the PBAs written), the DSD becomes read only. In another embodiment, when the DSD is full of data, new write operations may be serviced by overwriting the oldest PBAs. In this embodiment, a timeline can be generated for the DSD for a certain length of time (the last N sequences of write operations).

The code segments of the timeline application may be stored on any suitable computer readable storage medium, including volatile and non-volatile storage mediums. For example, the code segments may be installed onto a storage medium of a host computer, such as onto a disk drive, flash drive, CD ROM, DVD, etc. In another embodiment, the host computer may download the code segments from a network such as the Internet, wherein the code segments may be executed from volatile or non-volatile memory. The code segments may also comprise any suitable format, such as source code, executable code, script code, HTML, XML, etc.

The control circuitry 8 in the DSD 2 of FIG. 1A may comprise any suitable circuitry for implementing the embodiments of the present invention, such as a microprocessor for executing code segments of a control program, and/or state machine circuitry.

The log structured data may represent any suitable write pattern to the non-volatile memory 6 of FIG. 1A. In one embodiment, the access pattern may be sequential, such as by accessing data tracks from the ID to OD of the disk, or accessing sequential blocks of a flash memory. In other embodiments, the access pattern may be any non-sequential or partially non-sequential pattern.

There are several advantages to implementing a timeline application using the log structured data of a DSD as described above in the embodiments of the present invention. For example, in some embodiments the log structured data provides a timeline resolution of essentially every write operation executed by the DSD. This enables the timeline application to recover essentially every version of every file stored on the DSD. Another advantage of using log structured data according to an embodiment of the invention is that the timeline aspects are inherently included within the DSD without needing to enable or configure a conventional timeline and/or backup application. In addition, a separate backup DSD is not needed to implement the timeline features since the timeline aspects are inherent within each DSD. Yet another advantage of an embodiment of the invention is that the timeline features implemented within each DSD cannot be disabled or manipulated by an end user from a host computer. Consequently, an end user cannot easily tamper with the timeline data which may be valuable in various situations where securing the timeline data of a DSD is of significant concern, such as in military or other government applications, or when recording transportation data used to analyze accidents (auto, airline, etc.).

In certain applications, DSDs including one or more timeline features described above may be utilized as archival devices, wherein when a current DSD becomes full of data it is replaced with a new DSD and the old DSD shelved as an archived volume. In this manner an end user can recover essentially any version of any file by selecting the corresponding volume and evaluating the DSD using the timeline application described above.

What is claimed is:

1. A non-transitory computer readable storage medium comprising code segments of a timeline application, the code segments, which when executed by a computer processor, cause the computer processor to:
   receive log structured data from a data storage device (DSD), wherein:
   the log structured data comprises logical block addresses (LBAs) corresponding to a plurality of write operations performed on the DSD;
   the log structured data maps each LBA to a physical block address (PBA); and
   the log structured data comprises at least one duplicated instance of an LBA, wherein each instance of the LBA represents a different write operation;
   store an LBA map mapping at least one LBA to a PBA;
   command the DSD to roll the stored LBA map from a current state to a previous state corresponding to an entry in the log structured data by specifying a PBA in the log structured data corresponding to the previous state of the stored LBA map; and
   display timeline information related to the log structured data in an accounting window.

2. The non-transitory computer readable storage medium as recited in claim 1, wherein each instance of the LBA in the log structured data is mapped to a different PBA.

3. The non-transitory computer readable storage medium as recited in claim 1, wherein the code segments are further operable to evaluate the log structured data to identify modifications to file system data.

4. The non-transitory computer readable storage medium as recited in claim 3, wherein the accounting window displays the modifications to the file system data.

5. The non-transitory computer readable storage medium as recited in claim 3, wherein the code segments are further operable to identify LBAs assigned to the file system data.

6. The non-transitory computer readable storage medium as recited in claim 5, wherein the code segments are further operable to identify the LBAs assigned to the file system data by:
   commanding the DSD to roll the stored LBA map to an initial state; and
   reading the file system data from the DSD.

7. The non-transitory computer readable storage medium as recited in claim 5, wherein the code segments are further operable to:
   evaluate the log structured data to determine when an LBA of the file system data has been duplicated; and
   read the corresponding modified file system data from the DSD.

8. The non-transitory computer readable storage medium as recited in claim 7, wherein the code segments are further operable to read the corresponding modified file system data from the DSD by reading a PBA from the DSD corresponding to the duplicated LBA.

9. The non-transitory computer readable storage medium as recited in claim 7, wherein the code segments are further operable to read the corresponding modified file system data from the DSD by:
   commanding the DSD to roll the stored LBA map to a state when the LBA was duplicated; and
   read the LBA from the DSD.

10. The non-transitory computer readable storage medium as recited in claim 1, wherein the code segments are further operable to command the DSD to roll the stored LBA map to the state corresponding to the entry of the log structured data in response to a user selecting an entry from the accounting window.

11. The non-transitory computer readable storage medium as recited in claim 1, wherein the code segments are further operable to:
   select a target LBA from the log structured data; and
   transmit a read command to the DSD comprising the target LBA and a write operation identifier that identifies when the target LBA was written by the DSD.

12. The non-transitory computer readable storage medium as recited in claim 1, wherein the log structured data comprises at least one environmental condition at the time of each write operation.

13. The non-transitory computer readable storage medium as recited in claim 1, wherein the log structured data comprises location information at the time of each write operation.

14. The non-transitory computer readable storage medium as recited in claim 1, wherein the code segments are further operable to command the DSD to generate a log structured data file comprising the log structured data for a plurality of the write operations.

15. The non-transitory computer readable storage medium as recited in claim 1, wherein the code segments are further operable to display timeline information related to the log structured data for a particular file.

16. The non-transitory computer readable storage medium as recited in claim 1, wherein the log structured data includes a sequence number or a date for each LBA.

17. A method of operating a host computer, the host computer coupled to a data storage device (DSD), the method comprising:
receiving log structured data from the DSD, wherein:
the log structured data comprises logical block addresses (LBAs) corresponding to a plurality of write operations performed on the DSD;
the log structured data maps each LBA to a physical block address (PBA); and
the log structured data comprises at least one duplicated instance of an LBA, wherein each instance of the LBA represents a different write operation;
commanding the DSD to roll a stored LBA map from a current state to a previous state corresponding to an entry in the log structured data by specifying a PBA in the log structured data corresponding to the previous state of the stored LBA map, wherein the stored LBA map maps at least one LBA to a PBA; and
displaying timeline information related to the log structured data in an accounting window.

18. The method as recited in claim 17, wherein each instance of the LBA in the log structured data is mapped to a different PBA.

19. The method as recited in claim 17, further comprising evaluating the log structured data to identify modifications to file system data.

20. The method as recited in claim 19, wherein the accounting window displays the modifications to the file system data.

21. The method as recited in claim 19, further comprising identifying LBAs assigned to the file system data.

22. The method as recited in claim 21, wherein identifying the LBAs assigned to the file system data comprises:
commanding the DSD to roll the stored LBA map to an initial state; and
reading the file system data from the DSD.

23. The method as recited in claim 21, further comprising:
evaluating the log structured data to determine when an LBA of the file system data has been duplicated; and
reading the corresponding modified file system data from the DSD.

24. The method as recited in claim 23, further comprising reading the corresponding modified file system data from the DSD by reading a PBA from the DSD corresponding to the duplicated LBA.

25. The method as recited in claim 23, further comprising reading the corresponding modified file system data from the DSD by:
commanding the DSD to roll the stored LBA map to a state when the LBA was duplicated; and
reading the LBA from the DSD.

26. The method as recited in claim 17, further comprising commanding the DSD to roll the stored LEA map to the state corresponding to the entry of the log structured data in response to a user selecting an entry from the accounting window.

27. The method as recited in claim 17, further comprising:
selecting a target LEA from the log structured data; and
transmitting a read command to the DSD comprising the target LEA and a write operation identifier that identifies when the target LEA was written by the DSD.

28. The method as recited in claim 17, wherein the log structured data comprises at least one environmental condition at the time of each write operation.

29. The method as recited in claim 17, wherein the log structured data comprises location information at the time of each write operation.

30. The method as recited in claim 17, further comprising commanding the DSD to generate a log structured data file comprising the log structured data for a plurality of the write operations.

31. The method as recited in claim 17, wherein displaying timeline information includes displaying LBA information related to the log structured data for a particular file.

32. The method as recited in claim 17, wherein the log structured data includes a sequence number or a date for each LBA.

33. A data storage device (DSD) comprising:
a non-volatile memory comprising a plurality of memory segments, wherein a physical block address (PBA) is assigned to each memory segment; and
control circuitry operable to:
execute a first and a second write operation for a target logical block address (LBA), wherein the first write operation writes data to a first PBA, and the second write operation writes data to a second PBA;
maintain log structured data for the first and second write operations, including the LBA and the first and second PBAs;
transmit at least part of the log structured data to a host computer;
store an LBA map for mapping the LBA to the first and second PBAs; and
roll the stored LBA map from a current state to a previous state corresponding to an entry in the log structured data representing one of the first and second write operations by specifying the first PBA or the second PBA in the log structured data in response to a command received from the host computer.

34. The DSD as recited in claim 33, wherein the log structured data comprises a date of the first and second write operations.

35. The DSD as recited in claim 33, wherein the log structured data comprises a sequence number of the first and second write operations.

36. The DSD as recited in claim 33, wherein the control circuitry is further operable to:
receive a read command from the host computer, wherein the read command comprises a target LBA and a write operation identifier;
search the log structured data for a target PBA corresponding to the target LBA and the write operation identifier; and
return the target PBA to the host computer.

37. The DSD as recited in claim 36, wherein the write operation identifier comprises one of a date and a sequence number.

38. The DSD as recited in claim 33, wherein the log structured data comprises at least one environmental condition at the time of each write operation.

39. The DSD as recited in claim 33, wherein the log structured data comprises location information at the time of each write operation.

40. The DSD as recited in claim 33, wherein the control circuitry is further operable to generate a log structured data file comprising the log structured data for a plurality of write operations.

* * * * *